United States Patent

Long et al.

[11] Patent Number: 6,083,615
[45] Date of Patent: Jul. 4, 2000

[54] STRUCTURE BONDED WITH AN ELECTRICALLY CONDUCTIVE ADHESIVE

[75] Inventors: Lynn E. Long, Manhattan Beach; Robert A. Burns, Long Beach; Randall J. Moss, Thousand Oaks, all of Calif.

[73] Assignee: Hughes Electronics Corporation, El Segundo, Calif.

[21] Appl. No.: 08/895,182

[22] Filed: Jul. 16, 1997

Related U.S. Application Data

[63] Continuation-in-part of application No. 08/577,981, Dec. 22, 1995, Pat. No. 5,665,274.

[51] Int. Cl.[7] ............................................. B32B 5/16

[52] U.S. Cl. .................. 428/323; 156/62.2; 156/276; 156/330; 428/414; 428/543

[58] Field of Search ...................... 428/323, 327, 428/414, 543; 156/62.2, 276, 330

[56] References Cited

U.S. PATENT DOCUMENTS

| | | | |
|---|---|---|---|
| 4,749,833 | 6/1988 | Novorsky et al. | 219/10.43 |
| 5,583,321 | 12/1996 | DiStefano et al. | 174/264 |
| 5,595,801 | 1/1997 | Fahy et al. | 428/40.1 |
| 5,632,413 | 5/1997 | Herring et al. | 222/1 |
| 5,665,274 | 9/1997 | Long et al. | 252/511 |

*Primary Examiner*—Hoa T. Le
*Attorney, Agent, or Firm*—T. Gudmestad; M. W. Sales

[57] ABSTRACT

A structure is formed of at least two structural elements that are bonded together with an electrically conductive organic adhesive system. The adhesive system is a mixture of an organic adhesive such as a thermosetting epoxy and a filler of electrically conductive carbon particles having a porous, sponge-like structure. In one application, the structural elements are exterior panels of a spacecraft coated with an electrically conductive paint, and in other applications the structural elements are not coated. The adhesive system permits static electrical charge to flow through otherwise insulated joints to equalize the static potential throughout the structure and eventually to dissipate the charge.

4 Claims, 3 Drawing Sheets

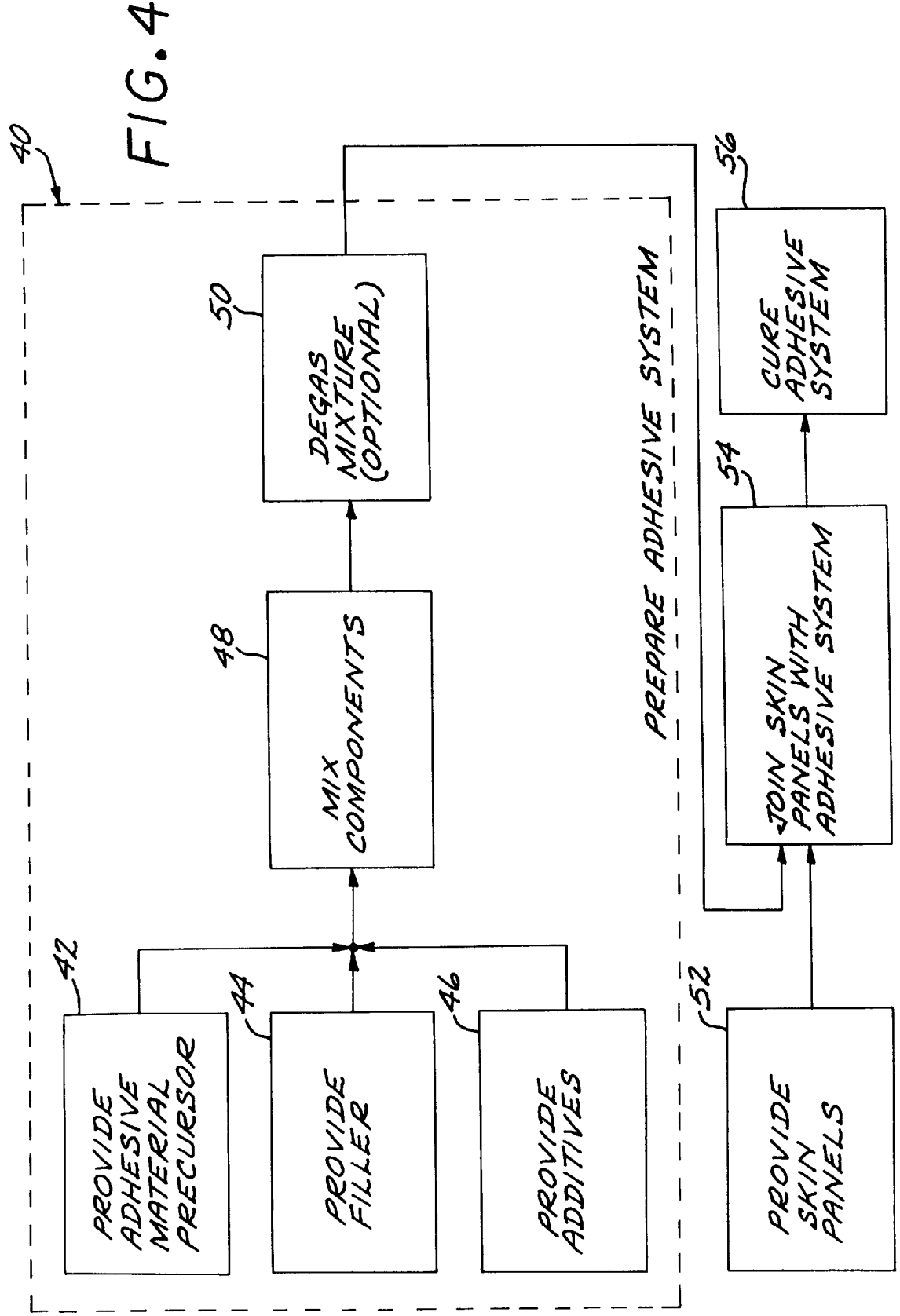

STRUCTURE BONDED WITH AN ELECTRICALLY CONDUCTIVE ADHESIVE

This application is a continuation-in-part of application Ser. No. 08/577,981, filed Dec. 22, 1995 now U.S. Pat. No. 5,665,274.

BACKGROUND OF THE INVENTION

This invention relates to a structure such as a spacecraft, and, more particularly, to a construction that achieves electrostatic charge dissipation at the surface of the structure.

Flight vehicles such as spacecraft develop electrostatic surface charges due to a variety of causes. When the outer skin panels are made of metals, that charge is readily conducted away and dissipated. However, when the outer skin is made of a nonconductive nonmetallic material or is coated with a nonconductive nonmetallic coating, the electrostatic charge is not mobile and may locally build up to high levels that can damage sensitive electronic equipment or the occupants of the vehicle, or can interfere with communications.

To dissipate the electrostatic charge in the latter instance, the outer skin panels may be coated with thermal control coatings which are also sufficiently electrically conductive to conduct the electrostatic charges away for dissipation. If the outer skin is made of multiple panels, the panels are bonded with a structural adhesive and interconnected with electrical conductors such as tabs or straps to allow the electrostatic charges to flow between panels, and eventually to dissipate. The tabs or straps are bonded to the panels with a silver-filled, non-structural adhesive, which is overcoated with a clear dielectric organic coating to prevent silver particles from contaminating the vehicle. This process is time consuming and expensive.

There is a need for an improved approach to the control of electrostatic-charge accumulation on flight vehicles. The present invention fulfills this need, and further provides related advantages.

SUMMARY OF THE INVENTION

The present invention provides a structure formed of two or more structural elements bonded together such that electrostatic surface charge in the structural elements is dissipated without the need for panel-to-panel electrical interconnectors such as metal foil tabs, straps, wires, or rivets. The present approach results in reduced weight due to the absence of the interconnectors and reduced construction cost. The primary interest of the inventors and application of the invention is spacecraft such as powered spacecraft and satellites, but the invention is applicable to other structures as well.

In accordance with the invention, a structure comprises a first structural element, a second structural element, and an electrically conductive structural adhesive system positioned between and bonding together the first structural element and the second structural element. The adhesive system comprises an organic adhesive material, and an electrically conductive filler comprising electrically conductive particles mixed with the organic adhesive material. The conductive particles have a porous, sponge-like structure with a surface area of at least about 250 square meters per gram. The preferred conductive particles are carbon particles. The electrically conductive filler is present in an amount sufficient to achieve the required electrical conductivity of the adhesive system, but no so large as to substantially degrade the mechanical properties of the adhesive system.

The present invention is applicable to a wide variety of structures. It is of most value when used in relation to structures which are subjected to electrostatic or other types of electrical charging in service, and whose structure inherently dissipates the electrical charge. An example of such structures is a spacecraft such as an orbiting satellite, whose outer surface is made of panels of metallic or nonmetallic materials such as composite materials.

Such structures are normally constructed with an internal structure. The surface panels are affixed to the internal structure and to each other. The surface panels may be coated with a thermal control paint which is also sufficiently electrically conductive to conduct the charge developed at the surface of the panel. However, the electrically conductive paint dissipates the charge only over the individual panel, and does not achieve panel-to-panel electrical interconnection. The adhesive bond at the interfaces between the panels, provided according to the present invention, conducts the charge through the panels for the equalization of the static potential and eventual dissipation of the charge.

The adhesive is preferably a thermosetting adhesive such as an epoxy. The filler is preferably carbon particles having a surface area of at least about 250 square meters per gram. The filler is preferably present in an amount of from about 7 to about 14 weight percent of the adhesive material. Various modifiers may also be added to the adhesive system, such as glass beads.

The adhesive system of the invention has acceptable strength for use as a structural adhesive. It has sufficient electrical conductivity to conduct static charges through the adhesive bond, between bonded structural elements. The electrical conductivity is retained even after thermal cycling of the type experienced in service.

The present approach allows the elimination of the electrically conductive tabs and straps that have heretofore been used to interconnect structural elements for electrostatic charge dissipation. The weight of the flight vehicle is reduced. The assembly cost is also reduced due to the simpler construction. Reliability is improved, because there is no tab or strap to fail locally. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 3A–C are schematic sectional views through the surface of either the satellite of FIG. 1 or the aircraft of FIG. 2, taken along line 3—3, wherein FIG. 3A illustrates the use of the invention in relation to panel-to-panel bonding, FIG. 3B illustrates the use in relation to a tube support, and FIG. 3C illustrates the use in relation to a bracket;

FIG. 4 is a block diagram of a preferred approach for practicing the invention;

DETAILED DESCRIPTION OF THE INVENTION

Figure 1:
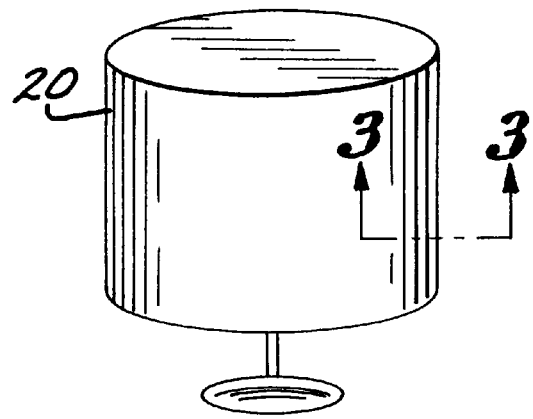
FIG. 1 is a perspective view of a satellite.
Figure 2:
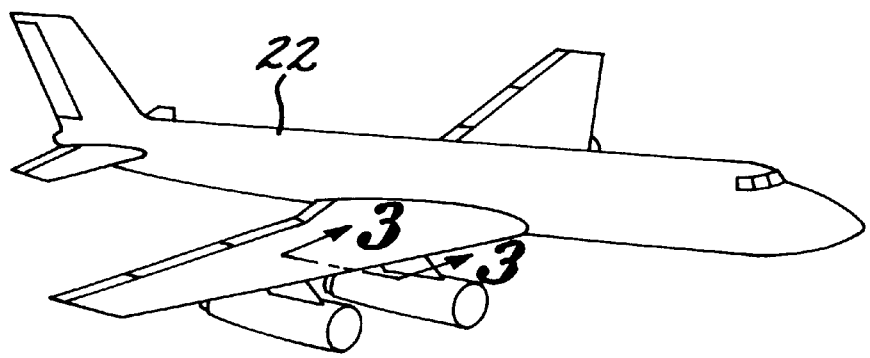
FIG. 2 is a perspective view of an aircraft.

The present invention is operable in relation to a wide variety of structures. The structures of most interest to the inventors are flight vehicles such as spacecraft and aircraft, and the preferred embodiments will be discussed in relation to such structures. The invention is not so limited, however. FIGS. 1 and 2 depict two types of flight vehicles that embody the approach of the invention. FIG. 1 shows a spacecraft 20, specifically a communications satellite. FIG. 2 shows an aircraft 22. The structural elements to be bonded are components of the spacecraft 20 or the aircraft 22.

Figure 3A:
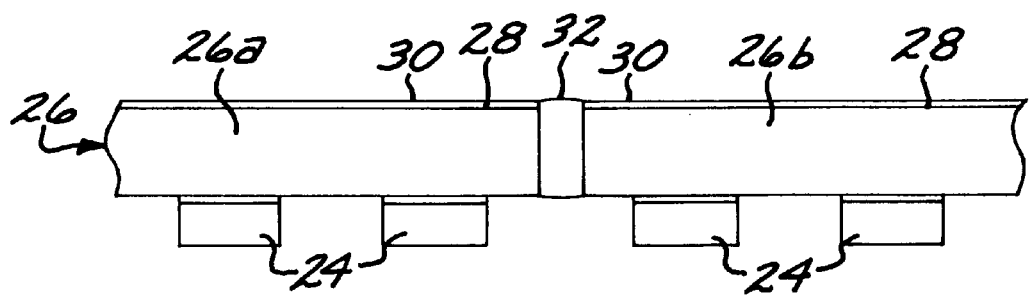
Figure 3B:
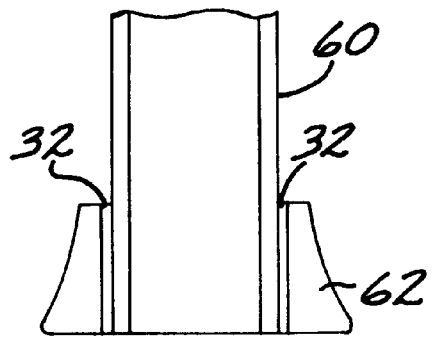
Figure 3C:
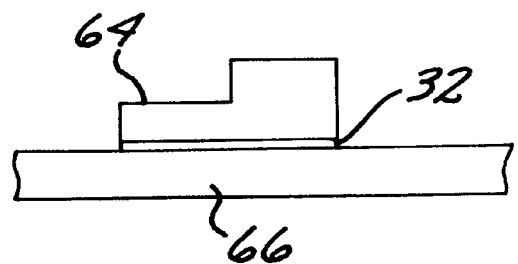

Details of construction vary among flight vehicles, and FIGS. 3A–3C depict some general forms of construction that utilize the approach of the invention. These forms of construction are presented as exemplary and not limiting of the application of the invention. Further, in each of FIGS. 3A–3C, the spacing between structural elements that are joined with the adhesive of the invention is exaggerated so that the location of the adhesive may be clearly depicted. Referring to FIG. 3A, the flight vehicle includes an internal structure 24 or frame to which outer skin panels 26 are affixed. The outer skin of the flight vehicle is typically formed as a plurality of panels, here depicted as two panels 26a and 26b, rather than a single continuous skin for technical, manufacturing, and cost reasons.

When the flight vehicle is in service, localized electrostatic charges tend to build on an outer surface 28 of the skin panels 26. The electrostatic charge is produced by any of several astronomical, electromagnetic, weather, or frictional causes. If the skin panels 26 are metallic with good electrical conduction, the electrostatic charge is conducted away from the localized site, distributed over a wide area, and dissipated. On the other hand, if the skin panels 26 are made of materials such as nonmetallic composites or ceramics that have poor electrical conduction, the electrostatic charges remain localized and can continue to build to unacceptably high levels that may interfere with instruments within the flight vehicle, with the occupants of the flight vehicle, or with communications to and from the flight vehicle. To overcome this electrostatic-charge-buildup problem with skin panels made of electrically nonconducting materials, the skin panels 26 may be coated with a layer 30 of a paint that has a degree of electrical conductivity sufficient to conduct the electrostatic charges. Such paints are known in the art, see for example U.S. Pat. No. 5,094,693, whose disclosure is incorporated by reference.

In either the case of skin panels made of electrically conductive materials or skin panels painted with an electrically conductive paint, the electrical conductivity associated with the panel allows the electrostatic charge to be dissipated over the area of the skin panel itself, but not between adjacent panels. Conventional practice has been to provide electrically conductive tabs, straps, wires, or rivets extending between adjacent skin panels so as to conduct the electrostatic charge and distribute it widely over the extent of the outer skin of the flight vehicle. The tabs and straps, where used, are affixed to the panels with silver-filled adhesive. While operable and used in many flight vehicles today, this approach is expensive and time consuming, and may have a degree of unreliability.

Other types of construction also require electrical conduction between joined structural elements. FIG. 3B illustrates a tube 60 made of a composite material such as a graphite-epoxy nonmetallic composite material, joined to a support 62. FIG. 3C illustrates a bracket 64 joined to a base 66. The base 66 may be one of the skin panels 26 or other structure.

FIG. 4 illustrates an approach for the bonding of skin panels of flight vehicles using the approach of the present invention, the preferred application shown in FIG. 3A. The procedure is equally applicable to the types of structures shown in FIGS. 3B and 3C, and to other structures as well. In this approach, the skin panels are bonded together with a structural adhesive system 32 (see FIGS. 3A–C) containing an electrically conductive filler that is present in an amount sufficient to render the adhesive system sufficiently electrically conductive to dissipate electrostatic charges but not so great as to reduce the strength of the adhesive material to an unacceptable low level.

The adhesive system is first prepared, numeral 40. An adhesive material precursor is provided, numeral 42. The adhesive material precursor is a material which is a structural adhesive or becomes a structural adhesive after proper processing. The adhesive material precursor is preferably a thermosetting or a thermoplastic organic resin material, most preferably a thermosetting organic resin material. Thermosetting adhesives include, for example, epoxies and polyurethanes. The preferred thermosetting epoxy resin systems are Hysol EA9323 and Hysol EA9396. Like most such epoxy resin systems, the Hysol EA9323 and Hysol EA9396 include the resin (part A) and the curing agent (part B), which are mixed together to initiate the chemical reaction that hardens and results in a structural adhesive material.

Figure 5:
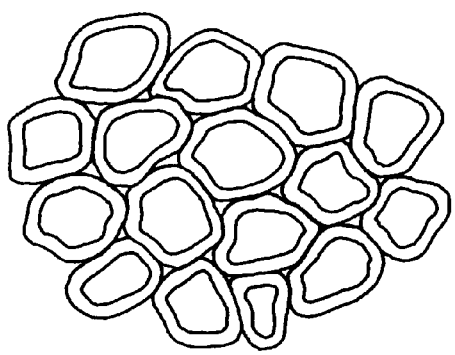
FIG. 5 is an enlarged perspective view of a carbon particle used in the adhesive of FIG. 3.

An electrically conductive filler is provided, numeral 44. The filler is particles having a porous, sponge-like structure. The preferred particles are porous carbon particles, but other conductive porous particles such as metallic (e.g., silver, gold, aluminum) particles may also be used. Carbon is preferred because it is light and available in porous form commercially. The particles have a porous, sponge-like structure, as illustrated in FIG. 5. Such particles are known and are available commercially. A preferred such carbon particle material is Printex L6 carbon pigment, available from Degussa Corp, Ridgefield Park, N.J. In general, such particles are prepared by the combustion or thermal decomposition of hydrocarbon compounds such as those found in petroleum, liquid coal tar hydrocarbons, natural gas, and acetylene. Such particles have a specific surface area of at least about 250 square meters per gram. This morphology is to be contrasted with that of conventional particles, as illustrated for Micro 280 graphite particles in FIG. 6. Such particles have a more dense, less open, substantially nonporous structure with a specific surface area that is typically on the order of about 13 square meters per gram.

Thus, for a selected weight of particulate filler, the sponge-like structure of the particles in FIG. 5 produces a larger particle size that extends over a larger effective volume. The result is a better, more certain interparticle charge flow path, with improved interparticle contact and connectivity, for any selected volume fraction of particles that are present in the adhesive system 32. The thickness of the sponge-structure walls is small in the porous, sponge-like particles. However, because the dissipation of electrostatic charges involves only very small current flows, this small wall thickness and consequent small current flow area are fully operable and acceptable, and in fact desirable due to the excellent connectivity between the particles.

Figure 6:
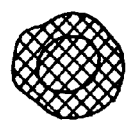
FIG. 6 is an enlarged perspective view of a conventional carbon particle.

The use of the porous electrically conductive particles is an important feature of the invention. When dense, nonporous particles of the type illustrated in FIG. 6 are mixed with an adhesive material, a large fraction of electrically conductive particles, on the order of 30 volume percent or more, of the total volume of the mixture is required in order to achieve sufficient electrical conductivity for the present purposes. That large a fraction of particles, however, reduces the strength of the adhesive so that the mixture is no longer coherent and adherent, and is so weak after curing that it can no longer serve as a structural adhesive. Thus, for example, the silver-filled adhesive mixture used to bond tabs and straps in current technology has about 65 percent silver. The resulting adhesive mixture is electrically conductive but so weak that it cannot bear significant structural loads. The porous particles used in the present invention, on the other hand, provide sufficient electrical conductivity when present in an amount of only about 7–14 weight percent of the adhesive, so that the strength of the mixture remains sufficiently high that it can be used as a structural adhesive.

The preferred porous carbon particles have a particle size of about 18 nanometers, although the particle size is not critical. The particles of filler are present in an amount of from about 7 to about 14 weight percent of the adhesive material. If less than this amount of filler is present, the final adhesive system has insufficient electrical conductivity after thermal cycling testing. Further, the electrical resistivity changes excessively with thermal cycling. If more than this amount of filler is present, the strength of the final structural adhesive system is degraded to an unacceptably low level. This range is to be contrasted with that of the non-structural silver-containing adhesive discussed previously.

Additives are provided as desired, numeral 46. In the present case, it is preferred to add glass beads to the adhesive in an amount of from about 0.1 to about 0.5 percent by weight of the adhesive. The glass beads aid in establishing a layer of the adhesive system 32 of a uniform, controllable thickness. The layer of the adhesive system 32 is preferably about 0.005 inches thick.

The components are mixed together, numeral 48, and optionally degassed, numeral 50, to remove air entrapped in the mixing step. The mixing 48 and degassing 50 steps are shown as serial operations, but they may include interspersed substeps tailored to the specifics of the components. When the adhesive precursor is the preferred thermosetting two-part system, it is preferred to mix the filler into the resin (Part A), and then mix in the curing agent (Part B) and the additives. The resulting mixture is thereafter degassed.

In an example of the preparation of the adhesive system, 100 parts by weight of Hysol EA9323 resin (Part A) is mixed with 13 parts by weight of Printex L6 carbon particles. The mixing is accomplished using a high-shear mixer or by hand using a spatula or stirring rod. The mixing is continued until the carbon pigment is uniformly dispersed throughout the mixture, typically about 5–10 minutes. The mixture is degassed in a vacuum of about 1 millimeter mercury. After this first degassing, 45 parts by weight of Hysol EA9323 curing agent (Part B) and 0.1–0.5 percent of glass beads having a diameter of from about 0.005 inches are mixed into the mixture of Part A resin and carbon particulate filler until all components are uniformly dispersed, typically about 2–5 minutes. The mixture is again degassed in a vacuum of about 1 millimeter mercury. The preparation of the adhesive system is complete.

This adhesive material may be used immediately or stored for a period of time at a temperature below about −40° C., so as to prevent partial curing prior to application of the adhesive.

To bond the panels, the skin panels 26a and 26b (with paint layer 30 already applied) are provided, numeral 52. A measure of the adhesive system material is placed between the ends of the skin panels and the panels are pressed together to form a butt joint as illustrated in FIG. 3, numeral 54. The ends to be joined may be primed prior to applying the adhesive system. The thickness of the adhesive layer (i.e., the distance between the facing ends of the panels 26a and 26b in FIG. 3) may be varied as desired, but is typically from about 0.005 to about 0.020 inches. Other structures such as those shown in FIGS. 3B and 3C are similarly joined with lap joints.

The adhesive system is thereafter cured as recommended, numeral 56. Curing procedures are specified for commercial adhesives. In the case of the Hysol EA9323 adhesive, the recommended curing procedure is any of the following: room temperature for 7 days; or 4 hours at 150° F.; or room temperature for 16 hours followed by 2 hours at 150° F.

Adhesive test pieces were prepared to test the operability of the invention. The test specimens were aluminum tensile lap shear test coupons, 1 inch by 4 inches on a side The adhesive was prepared as described above and applied to the cleaned (and primed in some cases with a conductive black bond primer) coupons. The bonded area was ½ inch by 1 inch in each case. The formulation of the adhesive system was as described above, except that some quantities were varied as set forth in the test results. The coupons were cured for 16 hours at room temperature followed by 2 hours at 150° F.

The electrical resistivity of the specimens was measured at room temperature ($\rho$ initial), at +150° C. ($\rho$+150° C.), at −150° C. ($\rho$−150° C.), and again at room temperature after 20 cycles of thermal cycling between −195° C. and +150° C. ($\rho$ cycling). The resistivity measurement was from end-to-end of the 1 inch by 4 inch lap shear specimens, through the adhesive of the ½ inch by 1 inch bonded region. Each resistivity value ($\rho$), measured in ohms per square, in the following table represents the average of six measurements. A dash indicates that no measurement was made.

| Primed | Carbon Percent | Thickness mils | $\rho$ Initial | $\rho$ +150° C. | $\rho$ −150° C. | $\rho$ cycling |
|---|---|---|---|---|---|---|
| No | 0 | 5 | $2.7 \times 10^8$ | — | — | — |
| No | 0 | 18 | $2.0 \times 10^8$ | — | — | — |
| No | 9 | 5 | $6.7 \times 10^4$ | — | — | — |
| No | 9 | 18 | $1.2 \times 10^7$ | $2.1 \times 10^6$ | $2.3 \times 10^6$ | $10 \times 10^6$ |
| No | 12 | 5 | $5.3 \times 10^6$ | — | — | — |
| No | 12 | 18 | $1.3 \times 10^7$ | $8.5 \times 10^5$ | $2.5 \times 10^6$ | $8.9 \times 10^6$ |
| Yes | 0 | 5 | $3.5 \times 10^8$ | — | — | — |
| Yes | 0 | 18 | $2.3 \times 10^8$ | — | — | — |
| Yes | 9 | 5 | $9.7 \times 10^4$ | — | — | — |
| Yes | 9 | 18 | $1.3 \times 10^5$ | $3.7 \times 10^5$ | $1.7 \times 10^5$ | $2.0 \times 10^5$ |
| Yes | 12 | 5 | $9.0 \times 10^4$ | — | — | — |
| Yes | 12 | 18 | $8.8 \times 10^4$ | $3.7 \times 10^5$ | $4.3 \times 10^4$ | $1.5 \times 10^5$ |

It was observed that the resistivity stabilized after only a few cycles. In comparative tests wherein the adhesive system contained lesser amounts of carbon, the resistivity continued to rise even after many thermal cycles.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A structure, comprising:

a first structural element;

a second structural element; and an electrically conductive structural adhesive system positioned between and bonding together the first structural element and the second structural element, the adhesive system comprising an organic thermosetting adhesive material, and an electrically conductive filler comprising electrically conductive carbon particles mixed with the organic adhesive material, wherein the carbon particles have a specific surface area of at least about 250 square meters per gram and are present in an amount of from about 7 to about 14 percent by weight of the adhesive material.

2. The structure of claim 1, wherein the first structural element and the second structural element are components of a flight vehicle.

3. The structure of claim 1, wherein the adhesive material is an epoxy.

4. The structure of claim 1, wherein there is no electrically conductive link between the first structural element and the second structural element other than the adhesive system.

* * * * *